United States Patent
Shen et al.

(10) Patent No.: US 10,074,040 B2
(45) Date of Patent: Sep. 11, 2018

(54) METHODS FOR COMPRESSING AND DECOMPRESSING TEXTURE TILES AND APPARATUSES USING THE SAME

(71) Applicant: VIA Alliance Semiconductor Co., Ltd., Shanghai (CN)

(72) Inventors: Yemao Shen, Shanghai (CN); Deming Gu, Shanghai (CN); Heng Que, Shanghai (CN); Wei Zhang, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 15/364,998

(22) Filed: Nov. 30, 2016

(65) Prior Publication Data
US 2018/0144215 A1    May 24, 2018

(30) Foreign Application Priority Data

Nov. 18, 2016   (CN) .......................... 2016 1 1018688

(51) Int. Cl.
| | | |
|---|---|---|
| G06K 9/62 | (2006.01) |
| H04N 19/13 | (2014.01) |
| H04N 19/186 | (2014.01) |
| G06K 9/46 | (2006.01) |
| H04N 19/44 | (2014.01) |
| H04N 19/42 | (2014.01) |
| H04N 19/184 | (2014.01) |
| H04N 19/182 | (2014.01) |
| H04N 19/423 | (2014.01) |

(52) U.S. Cl.
CPC .......... *G06K 9/6267* (2013.01); *G06K 9/4642* (2013.01); *G06K 9/4652* (2013.01); *H04N 19/13* (2014.11); *H04N 19/182* (2014.11); *H04N 19/184* (2014.11); *H04N 19/186* (2014.11); *H04N 19/423* (2014.11); *H04N 19/439* (2014.11); *H04N 19/44* (2014.11)

(58) Field of Classification Search
CPC .... G06K 9/6267; H04N 19/13; H04N 19/182; H04N 19/184; H04N 19/186; H04N 19/439; H04N 19/44
See application file for complete search history.

(56) References Cited

U.S. PATENT DOCUMENTS

| | | |
|---|---|---|
| 7,120,297 B2 | 10/2006 | Simard et al. |
| 2001/0041003 A1 | 11/2001 | Grohs et al. |
| 2005/0232501 A1 | 10/2005 | Mukerjee |

(Continued)

FOREIGN PATENT DOCUMENTS

WO    2013/088183 A1    6/2013

*Primary Examiner* — Ruiping Li
(74) *Attorney, Agent, or Firm* — McClure, Qualey & Rodack, LLP (57) ABSTRACT

The invention introduces a method for compressing texture tiles, which contains at least the following steps: classifying each pixel of a texture tile into one of a plurality of groups and generating a bitmap of the texture tile, wherein the bitmap contains information indicating to which group each pixel of the texture tile belongs; reducing dependencies between pixels of each group; lossless-encoding each pixel of the texture tile to generate a first compression result; and outputting the first compression result and the bitmap.

15 Claims, 9 Drawing Sheets

(56) References Cited

U.S. PATENT DOCUMENTS

| | | | |
|---|---|---|---|
| 2007/0217701 A1 | 9/2007 | Liu et al. | |
| 2009/0262126 A1* | 10/2009 | Zhang | H04N 19/176 |
| | | | 345/582 |
| 2009/0323089 A1* | 12/2009 | Hayasaki | H04N 1/642 |
| | | | 358/1.9 |
| 2010/0299454 A1 | 11/2010 | Lyashevsky | |

* cited by examiner

METHODS FOR COMPRESSING AND DECOMPRESSING TEXTURE TILES AND APPARATUSES USING THE SAME

CROSS REFERENCE TO RELATED APPLICATIONS

This application claims the benefit of China Patent Application No. 201611018688.1, filed on Nov. 18, 2016, the entirety of which is incorporated by reference herein.

BACKGROUND

Technical Field

The present invention relates to video processing, and in particular, to methods for compressing and decompressing texture tiles and apparatuses using the same.

Description of the Related Art

Video compression uses coding techniques to reduce redundancy in video data. In a high-resolution display, such as a 4K display, it may take up excessive memory space of graphics processing when all texture tiles are compressed lossless, resulting in increased hardware cost. Thus, it is desirable to have methods for compressing and decompressing texture tiles and apparatuses using the same to reduce memory space.

BRIEF SUMMARY

An embodiment of the invention introduces a method for compressing texture tiles, which contains at least the following steps: classifying each pixel of a texture tile into one of a plurality of groups and generating a bitmap of the texture tile, wherein the bitmap comprises information indicating to which group each pixel of the texture tile belongs; reducing dependencies between pixels of each group; lossless-encoding each pixel of the texture tile to generate a first compression result; and outputting the first compression result and the bitmap.

An embodiment of the invention introduces an apparatus for compressing texture tiles, at least containing a bitmap generator; a compressor; and a data generation controller. The data-reduction controller, coupled to the bitmap generator and the compressor, directs the bitmap generator to classify each pixel of a texture tile into one of a plurality of groups and generate a bitmap of the texture tile, where the bitmap comprises information indicating to which group each pixel of the texture tile belongs; and directs the compressor to reduce dependencies between pixels of each group, lossless-encode each pixel of the texture tile to generate a first compression result, and output the first compression result and the bitmap.

An embodiment of the invention introduces a method for decompressing texture tiles, which contains at least the following steps: receiving a compression result and a text flag; determining which one of a first algorithm and a second algorithm is used to reduce dependencies between pixels of a texture tile by an encoder; when the first algorithm is used to reduce dependencies between pixels of the texture tile by the encoder, lossless-decoding the compression result and using a third algorithm associated with the first algorithm to restore dependencies between pixels of the texture tile; and when the second algorithm is used to reduce dependencies between pixels of the texture tile by the encoder, obtaining a bitmap, lossless-decoding the compression result and using a fourth algorithm associated with the second algorithm to restore dependencies between pixels of the texture tile according to the bitmap to generate a first restored result.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
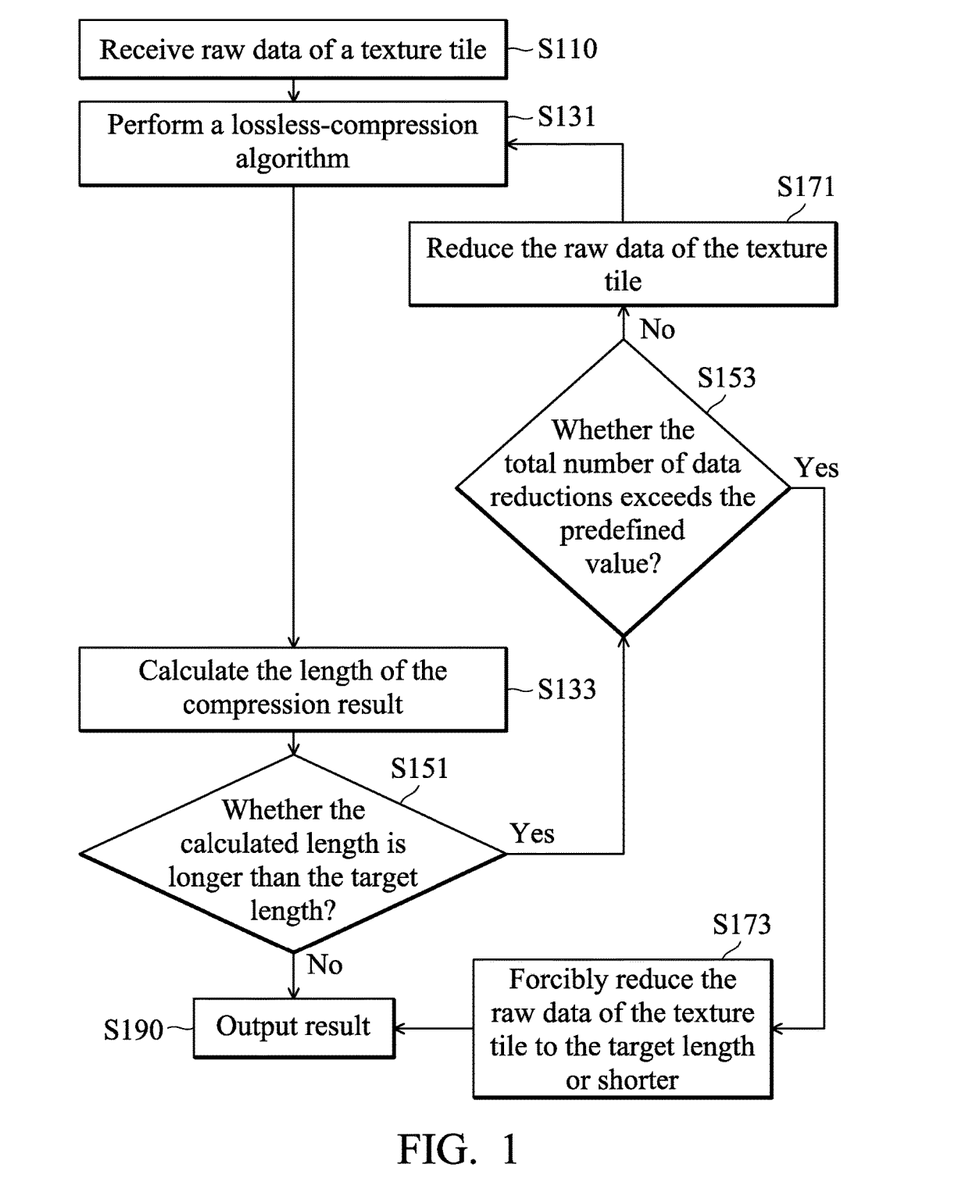
FIG. 1 is a flowchart illustrating a method for compressing texture tiles according to an embodiment of the invention.

To avoid information damage, embodiments of the invention begin to lossless-compress raw data of a texture tile and determine whether the length of the compression result is shorter than a target length. When the length of the compression result is longer than the target length, the raw data of the texture tile is reduced. However, the data reduction damages information of the raw data of the texture tile. To cause as little damage to the texture tile as possible, embodiments of the invention introduce data-reduction control in layers to reduce raw data of the texture tile in the minimum level and lossless compress the reduced data, thereby enabling the length of the compression result to be shorter than or equal to the target length. In the data-reduction control in layers, the raw data of the texture tile is reduced to a degree and the reduced data is lossless compressed. When the compression result of the reduced data is not shorter than or equal to the target length, the raw data of the texture tile is reduced to a greater degree (that is, the next reduction layer). Moreover, when the total number of data reductions exceeds a predefined value, the raw data of the texture tile is forcibly reduced to the target length or shorter so as to avoid further time consumption for the data reduction and lossless compression. FIG. 1 is a flowchart illustrating a method for compressing texture tiles according to an embodiment of the invention. The method may be performed in a texture encoder. After raw data of a texture tile is received (step S110), a lossless-compression algorithm is performed on the raw data (step S131). For example, the texture tile contains 8×8 pixels and each pixel may be formatted in RGBA8888, in which the R, G and B channels are each represented in 8 bits, so that the length of the raw data is 2048 bits. The target length may be set to 1024 bits. The length of the compression result is calculated (step S133). It is determined whether the calculated length is longer than the target length (step S151). When the calculated length is not longer than the target length, indicating that the lossless compression of the raw data is successful (the "No" path of step S151), the compression result (also referred to as the lossless-compression result) of the raw data and a lossy-level flag is output (step S190). The lossy-level flag may be "0b00" to indicate that the raw data of the texture tile has not undergone any data reduction. When the calculated length is longer than the target length, indicating that the lossless compression on the raw data was not successful (the "Yes" path of step S151), one or more data reductions in layers are performed (steps S171 or S173) and, if necessary, the reduced data undergoes the lossless-compression algorithm (step S131).

In the data reduction in each layer to the texture tile and the lossless compression of the reduced data, it is determined whether the total number of data reductions exceeds the predefined value (step S153). A counter may be used to indicate the total number of times the raw data of the texture tile has been reduced. The counter is initially set to zero and increases by one each time the raw data of the texture tile is reduced (step S171). When the total number of data reductions exceeds the predefined value (the "Yes" path of step S153), the raw data of the texture tile is forcibly reduced to the target length or shorter (step S173). In some embodiments, the raw data of the texture tile may be reduced using the Equations below:

$$R_i = R_i / m_j \quad (1)$$

$$G_i = G_i / m_j \quad (2)$$

$$B_i = B_i / m_j \quad (3)$$

$R_i$ represents an R-value of the $i^{th}$ pixel of the raw data, $G_i$ represents the G-value of the $i^{th}$ pixel of the raw data, $B_i$ represents the B-value of the $i^{th}$ pixel of the raw data, $m_j$ represents a constant for the $j^{th}$ data reduction and a greater j comes a greater $m_j$. It should be understood that the remainders produced by Equations (1) to (3) are dropped.

In some embodiments, the predefined value may be set to 2 in step S153. In addition, $m_1$ may be set to 2, $m_2$ may be set to 3 and $m_3$ may be set to 8. In the data reduction of the first layer (j=1), the raw data of the texture tile (including R-, G- and B-channels, or R, G, B and A-channels) may be divided into $m_1$ (step S171). Next, the reduced data undergoes lossless-compression via the lossless-compression algorithm (step S131), and it is determined whether the length of the compression result (also referred to as the lossless-compression result of the reduced data) is longer than the target length (step S151). When the length of the compression result is not longer than the target length, indicating that the lossless compression of the reduced data is successful (the "No" path of step S151), the compression result of the reduced data and the lossy-level flag "0b01" indicating that the raw data of the texture tile that has undergone the data reduction of the first layer are output (step S190). When the length of the compression result is longer than the target length, indicating that the lossless compression on the reduced data was not successful (the "Yes" path of step S151), the data reduction of the next layer is performed (steps S153, S171 and S173). In the data reduction of the second layer (j=2), the raw data of the texture tile (including R-, G- and B-channels, or R, G, B and A-channels) may be divided into $m_2$ (step S171). Next, the reduced data undergoes the lossless-compression algorithm (step S131), and it is determined whether the length of the compression result is longer than the target length (step S151). When the length of the compression result is not longer than the target length, indicating that the lossless compression of the reduced data is successful (the "No" path of step S151), the compression result of the reduced data and the lossy-level flag "0b10", which indicates that the raw data of the texture tile has undergone the data reduction of the second layer, are output (step S190). In the data reduction of the third layer (j=3), the raw data of the texture tile (including R-, G- and B-channels, or R, G, B and A-channels) may be divided into $m_3$ (step S171), and the reduced data and the lossy-level flag "0b11", which indicates that the raw data of the texture tile is forcibly reduced to the target length or shorter, are output (step S190).

In some embodiments, the predefined value may be set to 3 in step S153. In addition, $m_1$ may be set to 2, $m_2$ may be set to 3, $m_3$ may be set to 8 and $m_4$ may be set to 16. The lossy-level flag in step S190 may be represented in three bits, where "0b000" indicates that the raw data of the texture tile has not undergone any data reduction, "0b001" indicates that the raw data of the texture tile has undergone the data reduction of the first layer, "0b010" indicates that the raw data of the texture tile has undergone the data reduction of the second layer, "0b011" indicates that the raw data of the texture tile has undergone the data reduction of the third layer and "0b1000" or "0b111" indicates that the raw data of the texture tile has been forcibly reduced to the target length or shorter.

In some embodiments, the lossless-compression algorithm may reduce dependencies within each pixel or/and between pixels, and then perform a lossless encoding. In order to reduce dependencies within each pixel, R-, G- and B-channels of each pixel are computed. In order to reduce dependencies between pixels, except for the pixel (0,0) of the texture tile (also referred to as the upper-left pixel of the texture tile), the R, G, B and A-channels of each pixel are subtracted from the R, G, B and A-channels of the pixel (0,0), respectively.

In some embodiments, the lossless-compression algorithm may detect whether the texture tile matches one of the prediction modes. If so, data of several pixels is retained and necessary information of the matched prediction mode, such as an angle, a length, a width, etc., is recorded. For example, when the texture tile contains only solid color, data of one pixel is retained and a prediction flag is used to indicate that the texture tile is a solid-color tile. Otherwise, dependencies within each pixel or/and between pixels are reduced, and then a lossless encoding is performed.

The lossless encoding may be adaptive dictionary encoding, unary encoding, entropy encoding, or another type of encoding.

Figure 2:
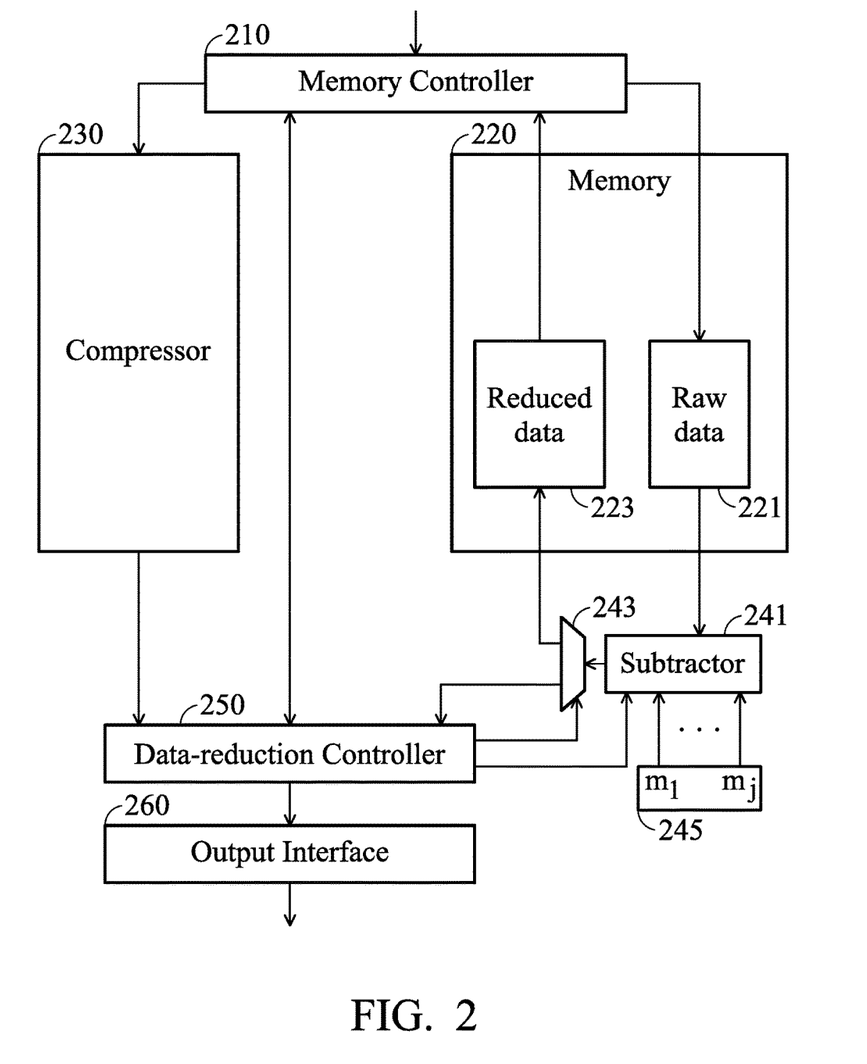
FIG. 2 is a block diagram of an apparatus for compressing texture tiles according to an embodiment of the invention.

FIG. 2 is a block diagram of an apparatus for compressing texture tiles according to an embodiment of the invention. A data-reduction controller 250 directs a memory controller 210 to output raw data of texture tiles to a compressor 230, thereby enabling the compressor 230 to generate a compression result (also referred to as a lossless-compression result) of the raw data. Subsequently, the data-reduction controller 250 determines whether the length of the compression result of the raw data is longer than a target length. If so, the data-reduction controller 250 performs the data-reduction control in layers for directing a subtractor 241 to generate reduced data by reducing the raw data and directing the memory controller 210 to output the reduced data to the compressor 230, thereby enabling the compressor 230 to generate a compression result of the reduced data, where the length of the compression result of the reduced data is shorter than or equal to the target length. The data-reduction control in layers generates the reduced data by reducing the raw data in the minimum level. In the data-reduction control in layers, the data-reduction controller 250 directs the subtractor 241 to reduce the raw data to a degree to generate reduced data and directs the memory controller 210 to output the reduced data to the compressor 230, thereby enabling the compressor 230 to generate a compression result of the reduced data. When the length of the compression result of the reduced data is longer than the target length and the total number of data reductions does not exceed a predefined value, the data-reduction controller 250 directs the subtractor 241 to reduce the raw data to a greater degree. When the length of the compression result of the reduced data is longer than the target length and the total number of data reductions exceeds the predefined value, the data-reduction controller 250 directs the subtractor 241 to reduce the raw data to a length within the target length forcibly and output the reduction result without performing lossless compression.

Specifically, after receiving raw data of a texture tile, the data-reduction controller 250 directs the memory controller 210 to store the raw data in a region 221 of a memory 220 and output the raw data to the compressor 230, thereby enabling the compressor 230 to perform the lossless-compression algorithm on the raw data. The compressor 230 may perform the lossless-compression algorithm on the raw data received from the memory controller 210 and output a compression result to the data-reduction controller 250. Details of the compressor 230 may refer to the description of step S131, and are omitted for brevity.

The data-reduction controller 250 may contain a counter to count the total number of times that the texture tile has undergone data reduction, with an initial setting of 0. The data-reduction controller 250 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The data-reduction controller 250 calculates the length of the compression result and determines whether the length of the compression result is longer than the target length. When the counter is 0 and the length of the compression result is not longer than the target length, the data-reduction controller 250 outputs the compression result and the lossy-level flag, which indicates that the raw data of the texture tile has not undergone any data reduction, to an electronic component via an output interface 260. When the counter is not 0, and is lower than or equal to the predefined value, and the length of the compression result is longer than the target length, the data-reduction controller 250 controls the subtractor 241 to generate reduced data by dividing the R-, G- and B-channels of each pixel of the raw data of the memory 220 by the corresponding one of the constants $m_1$ to $m_{j-1}$, controls a de-multiplexer 243 to output the reduced data to a region 223 of the memory 220 and controls the memory controller 210 to read the reduced data from the region 223 and output the reduced data to the compressor 230, where j is the predefined value plus 1. A register 245 latches the constants $m_1$ to $m_j$. Embodiments for setting the constants $m_1$ to $m_j$ are the same as the descriptions in the above paragraphs and are omitted for brevity. When the counter is not 0, and is lower than or equal to the predefined value, and the length of the compression result is not longer than the target length, the data-reduction controller 250 outputs the compression result and the lossy-level flag, which indicates that the raw data of the texture tile has undergone data reduction in a particular layer, to an electronic component. Embodiments for setting the lossy-level flag may refer to the descriptions in the paragraphs above and are omitted for brevity. When the counter is greater than the predefined value and the length of the compression result is longer than the target length, the data-reduction controller 250 controls the subtractor 241 to generate reduced data by dividing the R-, G- and B-channels of each pixel of the raw data of the memory 220 by the constant $m_j$, controls the de-multiplexer 243 to output the reduced data to the data-reduction controller 250 and output the reduced data and the lossy-level flag, which indicates that the raw data of the texture tile is forcibly reduced to the target length or shorter, to an electronic component via the output interface 260. The subtractor 241 may implement Equations (1) to (3) to reduce the raw data of the texture tile.

Figure 3:
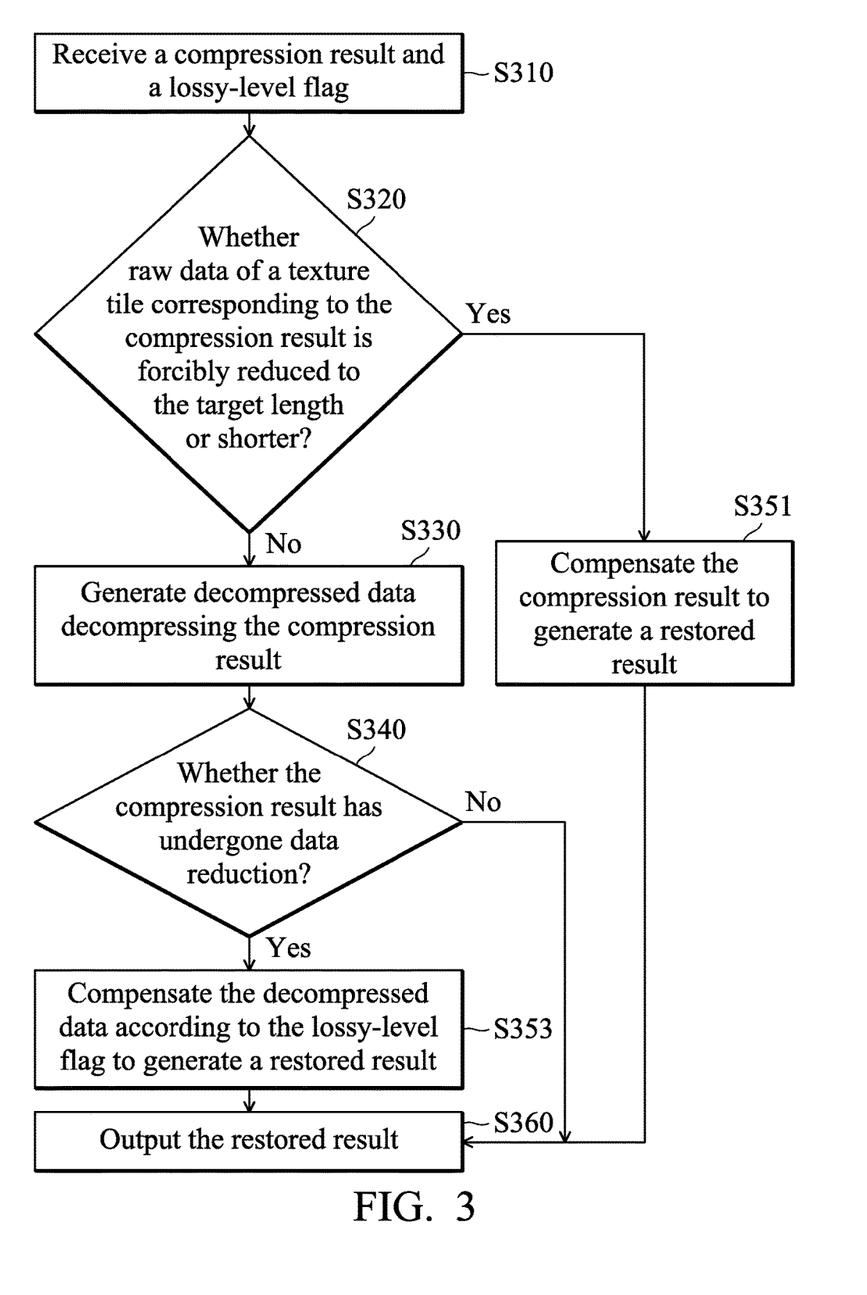
FIG. 3 is a flowchart illustrating a method for decompressing texture tiles according to an embodiment of the invention.

In order to restore the texture tile that has undergone data-reduction control in layers, a method for decompressing texture tiles is provided. FIG. 3 is a flowchart illustrating the method for decompressing texture tiles according to an embodiment of the invention. The method may be performed in a texture decoder. After a compression result and a lossy-level flag are received (step S310), it is determined whether raw data of a texture tile corresponding to the compression result is forcibly reduced to the target length or shorter (step S320). For example, it is determined whether the lossy-level flag is "0b11 (in two bits)", "0b100 (in three bits)" or "0b111 (in three bits)". If so (the "Yes" path of step S320), the compression result is compensated to generate a restored result (step S351) and the restored result is output to a texture operation of a 3D (three-dimensional) pipeline (step S360). In some embodiments, the compression result may be compensated by using the Equations below:

$$R_i = R_i * m_{max} + c_{max} \qquad (4)$$

$$G_i = G_i * m_{max} + c_{max} \qquad (5)$$

$$B_i = B_i * m_{max} + c_{max} \qquad (6)$$

$R_i$ represents an R-value of the $i^{th}$ pixel of the compression result, $G_i$ represents the G-value of the $i^{th}$ pixel of the compression result, $B_i$ represents the B-value of the $i^{th}$ pixel of the compression result, $m_{max}$ represents a restoring constant and $c_{max}$ represents a compensation constant. Assume that the original length of the texture tile is 2048 bits and the target length of the compression result is 1024 bits: $m_{max}$ may be set to 8 and $c_{max}$ may be set 3 or 6 according to past experience.

When raw data of a texture tile corresponding to the compression result is not forcibly reduced to the target length or shorter (the "No" path of step S320), decompressed data is generated by decompressing the compression result (step S330).

In some embodiments, step S330 may perform a lossless decoding, and then restore dependencies within each pixel or/and between pixels. The lossless decoding may be adaptive dictionary decoding, unary decoding, entropy decoding, or another type of decoding. In order to restore dependencies within each pixel, R-, G- and B-channels of each pixel are computed. In order to reduce dependencies between pixels, except for the pixel (0,0) of the texture tile, the R, G and B and A-channels of the pixel (0,0) are added to the R, G, B and A-channels of each pixel, respectively.

In some embodiments, step S330 may detect whether the received data of the texture tile matches one of the prediction modes according to a prediction flag. If so, raw data of the texture tile is restored according to the detected prediction mode and relevant pixel data. For example, when only solid color is detected in the texture tile, the only pixel data is filled with the whole texture tile (8×8 pixels). If any prediction mode is not found, a lossless decoding is performed, and then dependencies within each pixel or/and between pixels are restored.

Subsequently, it is determined whether the compression result has undergone data reduction (step S340). For example, it is determined whether the lossy-level flag is "0b00 (in two bits)" or "0b000 (in three bits)". If not (the "No" path of step S340), the decoded result is output to the texture operation of the 3D pipeline (step S360).

When the compression result has undergone data reduction (the "Yes" path of step S340), a restored result is generated by compensating the decompressed data according to the lossy-level flag (step S353) and the restored result is output to the texture operation of the 3D pipeline (step S360). In some embodiments, the decompressed data may be compensated for using the Equations below:

$$R_i = R_i * m_j + c_j \quad (7)$$

$$G_i = G_i * m_j + c_j \quad (8)$$

$$B_i = B_i * m_j + c_j \quad (9)$$

$R_i$ represents an R-value of the $i^{th}$ pixel of the decompressed data, $G_i$ represents the G-value of the $i^{th}$ pixel of the decompressed data, $B_i$ represents the B-value of the $i^{th}$ pixel of the decompressed data, $m_j$ represents a restoring constant for the $j^{th}$ reduction, a greater j comes a greater is less than $m_{max}$, $c_j$ represents a compensation constant for the $j^{th}$ reduction, a greater j comes a greater $c_j$ and $c_j$ is less than $c_{max}$. $m_j$ may be determined according to the lossy-level flag and $c_j$ may be set 2 or 4 according to past experience.

Figure 4A:
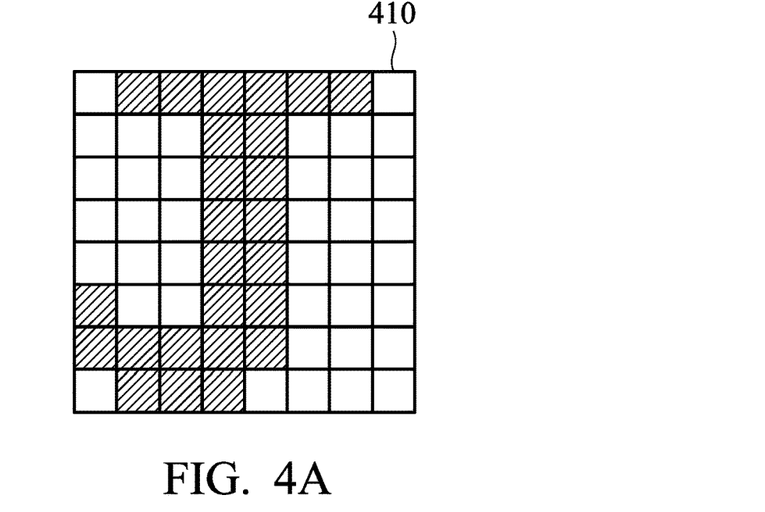
FIGS. 4A and 4B are schematic diagrams of texture tiles according to embodiments of the invention.
Figure 4B:
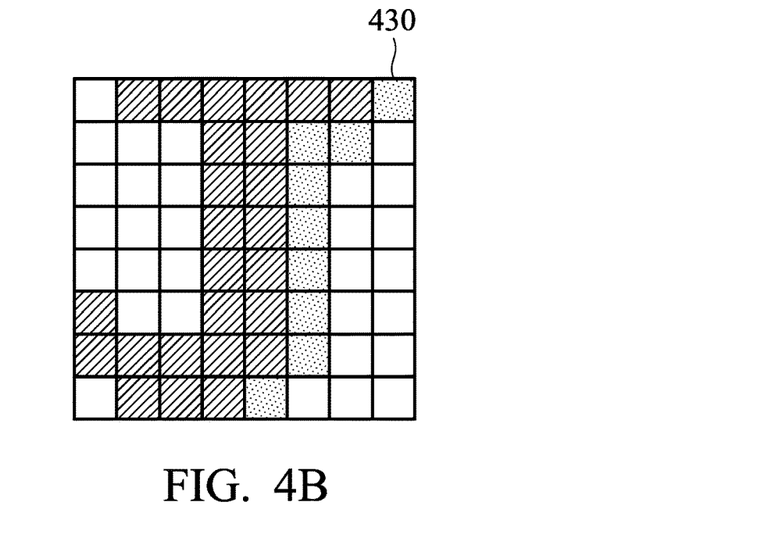

The texture tile may contain text information. FIGS. 4A and 4B are schematic diagrams of texture tiles according to embodiments of the invention. Refer to FIG. 4A. In some embodiments, a texture tile 410 contains an English letter "J", pixels of the English letter (blocks in slashes of FIG. 4A, may be referred to as foreground pixels) are (close to) a solid color and the differences between the foreground and background pixels are big. Refer to FIG. 4B. In some embodiments, except for foreground and background pixels, a shadow is present between the text and the background pixels (blocks in dots of FIG. 4B, may be referred to as intermediate pixels). However, whether the texture tile contains text information should be taken into account in an algorithm for reducing dependencies between pixels. Otherwise, it may hinder the subsequent lossless encoding and fail to compress data of a texture tile to the target length.

Figure 5:
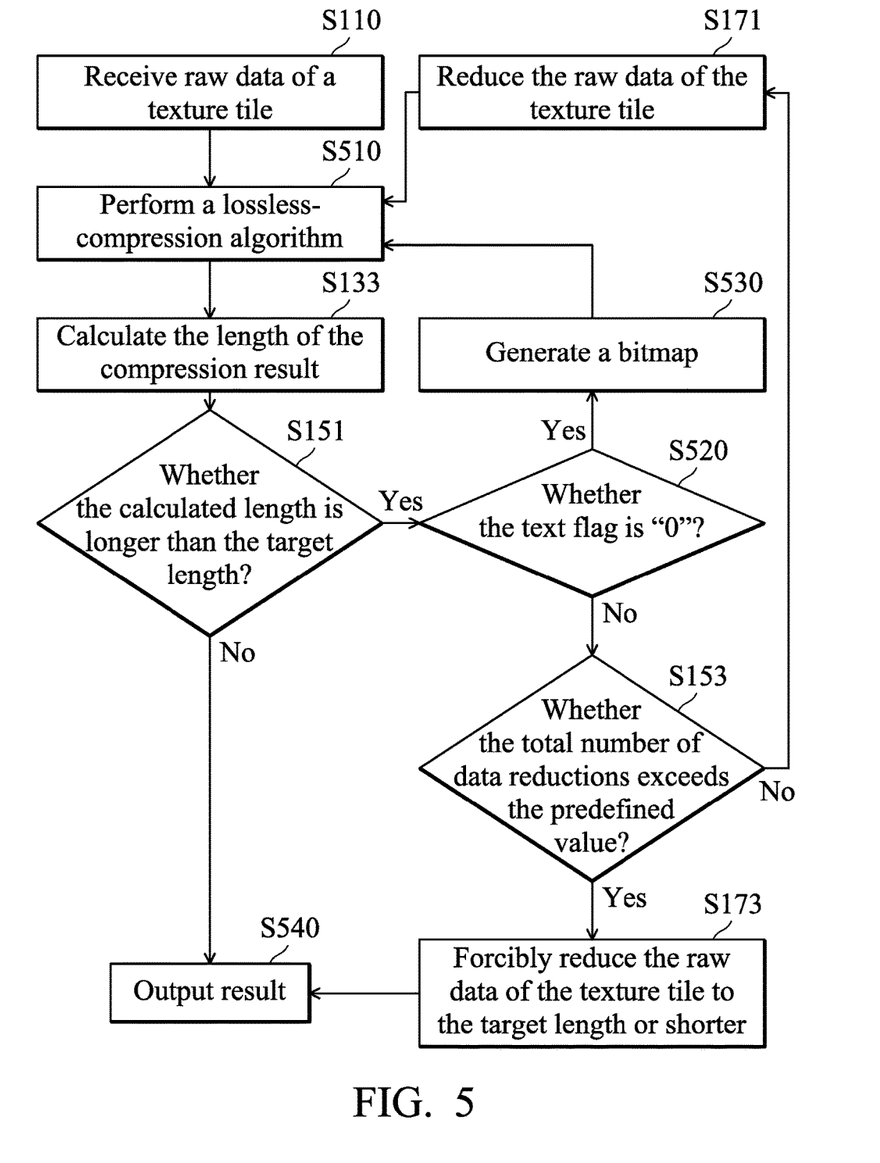
FIG. 5 is a flowchart illustrating a method for compressing texture tiles according to an embodiment of the invention.

FIG. 5 is a flowchart illustrating a method for compressing texture tiles according to an embodiment of the invention. The method may be performed in a texture encoder. After raw data of a texture tile is received (step S110), the raw data undergoes lossless-compression via a lossless-compression algorithm (step S510). In step S110, a text flag is initiated to "0", which indicates that a first algorithm is used to reduce dependencies between pixels. For example, the texture tile contains 8×8 pixels and each pixel may be formatted in RGBA8888, in which the R, G and B channels are each represented in 8 bits, so that the length of the raw data is 2048 bits. The target length may be set to 1024 bits. In step S510, since the text flag is "0", the lossless-compression algorithm reduces dependencies between pixels using the first algorithm, and then performs a lossless encoding. The first algorithm considers that data of the texture tile excludes text information. In some embodiments of the first algorithm, except for the pixel (0,0) of the texture tile, the R, G, B and A-channels of each pixel are subtracted from the R, G, B and A-channels of the pixel (0,0), respectively. Those skilled in the art may use a similar but different first algorithm according to different design requirements and the invention should not be limited thereto. The lossless encoding may be adaptive dictionary encoding, unary encoding, entropy encoding, or another type of encoding.

Subsequently, the length of the compression result (also referred to as the lossless-compression result) is calculated (step S133), it is determined whether the calculated length is longer than the target length (step S151). When the calculated length is not longer than the target length, indicating that the lossless compression of the raw data is successful (the "No" path of step S151), the compression result, a text flag, and a lossy-level flag are output (step S540). The text flag may be "0" to indicate that the first algorithm is used to reduce dependencies between pixels of the compression result. The lossy-level flag may be "0b00" to indicate that the raw data of the texture tile has not undergone any data reduction. When the calculated length of the compression result is longer than the target length, indicating that the lossless compression on the raw data was not successful (the "Yes" path of step S151), it is determined whether the text flag is "0" (step S520). When the calculated length is longer than the target length (the "Yes" path of step S151), the text flag is set to "1" to indicate that the second algorithm is used to reduce dependencies between pixels and a bitmap is generated to contain information indicating to which one of the groups each pixel of the texture tile belongs (step S530). The second algorithm classifies the pixels of the texture tile into the groups and reduces dependencies between pixels of each group. In an example, each pixel of the texture tile is labeled as a foreground or a background. In another example, each pixel of the texture tile is labeled as a foreground, an intermediary or a background. In some embodiments of step S530, specifically, histograms of R-, G- and B-channels of the textile are generated and boundary values of the R-, G- and B-channels are calculated accordingly. The boundary values may be averages or medians of the R-, G- and B-channel histograms. Next, it is determined whether the R-, G- and B-values of each pixel are greater than the boundary values of R-, G- and B-channels, respectively. When two or more of the R-, G- and B-values of a pixel are greater than the respective boundary values, the pixel is labeled as the foreground pixel. Otherwise, the pixel is labeled as the background pixel. For example, one bit of the bitmap of Table 1 is used to indicate that a pixel is a foreground or background pixel:

TABLE 1

| 0 | 1 | 1 | 1 | 1 | 1 | 1 | 0 |
|---|---|---|---|---|---|---|---|
| 0 | 0 | 0 | 1 | 1 | 0 | 0 | 0 |
| 0 | 0 | 0 | 1 | 1 | 0 | 0 | 0 |
| 0 | 0 | 0 | 1 | 1 | 0 | 0 | 0 |
| 0 | 0 | 0 | 1 | 1 | 0 | 0 | 0 |
| 1 | 0 | 0 | 1 | 1 | 0 | 0 | 0 |
| 1 | 1 | 1 | 1 | 1 | 0 | 0 | 0 |
| 0 | 1 | 1 | 1 | 0 | 0 | 0 | 0 |

"1" represents the foreground pixel, "0" represents the background pixel and the foreground pixels may be collected to form a letter, an alphanumeric character, a symbol, and so on. In some other embodiments of step S530, specifically, histograms of R-, G- and B-channels of the textile are generated, middle ranges of the R-, G- and B-channels are calculated accordingly, and each middle range contains a lower value and an upper value. Next, it is determined whether the R-, G- and B-values of each pixel are greater than the upper values of R-, G- and B-channels and less than the lower values of R-, G- and B-channels, respectively. When two or more of the R-, G- and B-values of a pixel are greater than the respective upper values, the pixel is labeled as the foreground pixel. When two or more of the R-, G- and B-values of the pixel are less than the respective lower values, the pixel is labeled as the background pixel. When the pixel is neither the foreground pixel nor the background pixel, the pixel is labeled as the intermediary pixel. For example, two bits of the bitmap of Table 2 is used to indicate that a pixel is a foreground, intermediary or background pixel:

TABLE 2

| 00 | 11 | 11 | 11 | 11 | 11 | 11 | 10 |
|----|----|----|----|----|----|----|----|
| 00 | 00 | 00 | 11 | 11 | 10 | 00 | 00 |
| 00 | 00 | 00 | 11 | 11 | 10 | 00 | 00 |
| 00 | 00 | 00 | 11 | 11 | 10 | 00 | 00 |
| 00 | 00 | 00 | 11 | 11 | 10 | 00 | 00 |
| 11 | 00 | 00 | 11 | 11 | 10 | 00 | 00 |
| 11 | 11 | 11 | 11 | 11 | 10 | 00 | 00 |
| 00 | 11 | 11 | 11 | 10 | 00 | 00 | 00 |

"11" represents the foreground pixel, "10" represents the intermediary pixel and "00" represents the background pixel, the foreground pixels may be collected to form a letter, an alphanumeric character, a symbol, and so on, and the intermediary pixels may be collected to form a shadow.

Figure 6A:
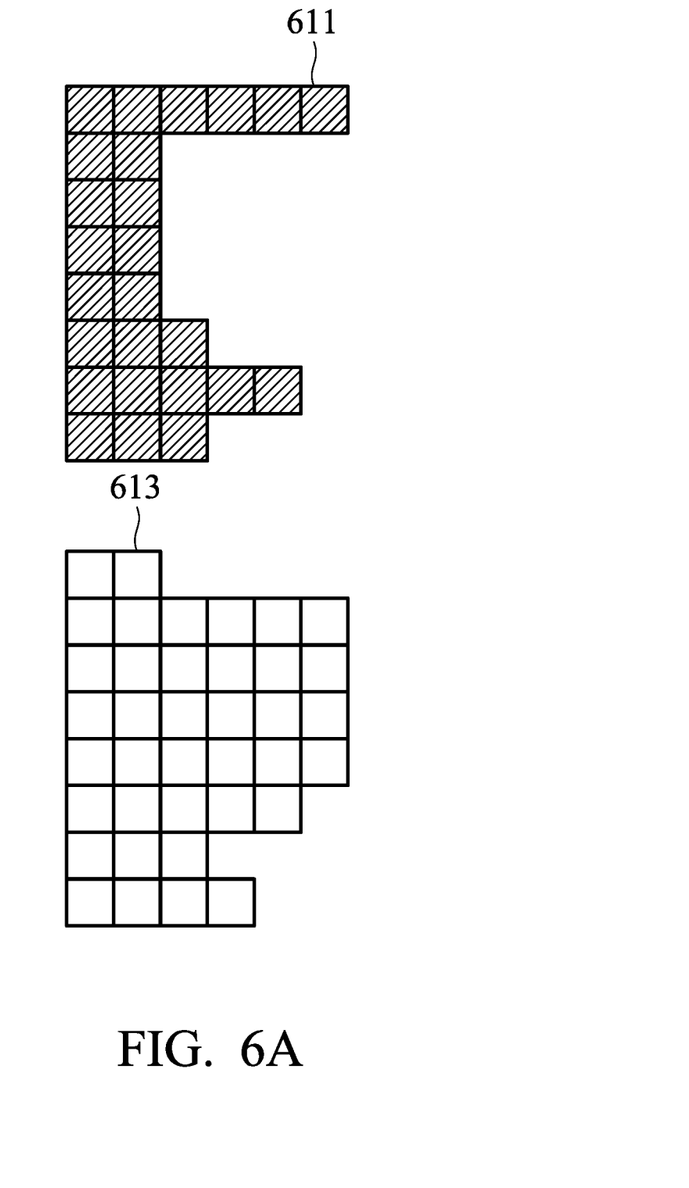
FIGS. 6A and 6B are schematic diagrams of pixel groupings according to embodiments of the invention.
Figure 6B:
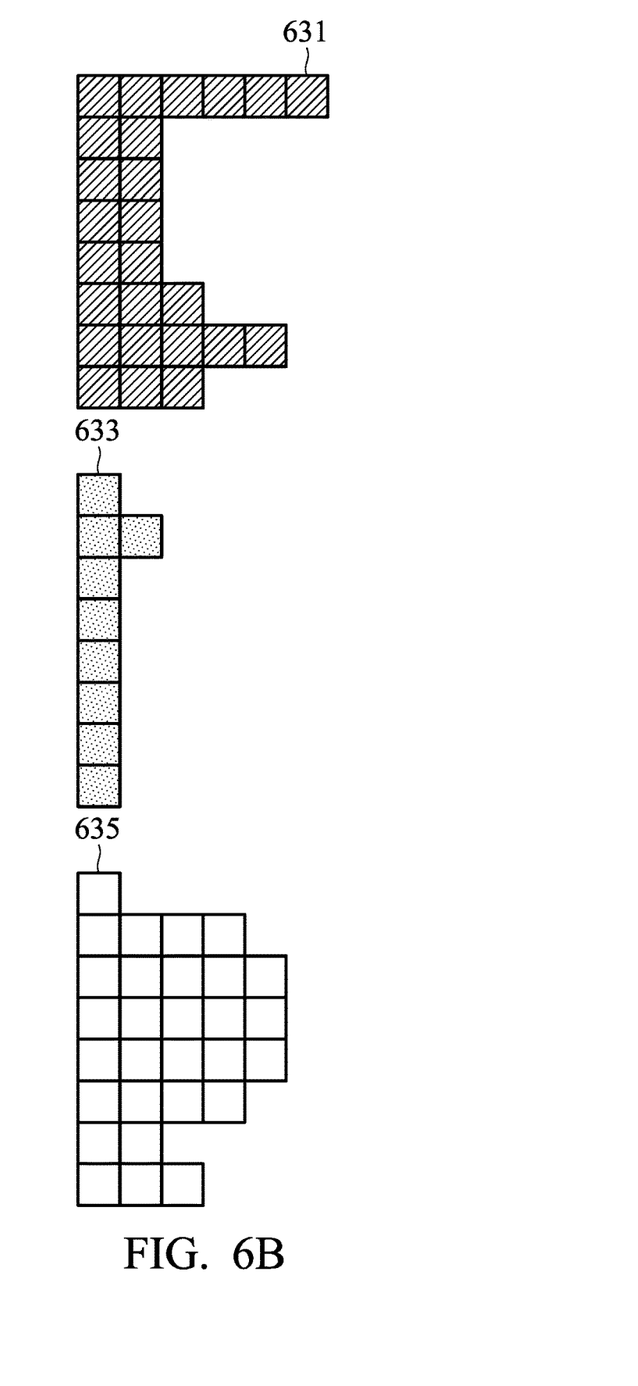

Subsequently, in step S510, since the text flag is "1", the lossless-compression algorithm may use the second algorithm to reduce the dependencies between pixels, and then perform the lossless encoding on the reduced data. The second algorithm considers that data of the texture tile includes text information. The second algorithm classifies the pixels into two or three groups according to the bitmap (as shown in Table 1 or 2). FIG. 6A is a schematic diagram of pixel groupings according to an embodiment of the invention. For example, according to the bitmap of Table 1, the pixels of the texture tile 410 may be classified into a foreground group 611 and a background group 613. FIG. 6B is a schematic diagram of pixel groupings according to an embodiment of the invention. For example, according to the bitmap of Table 2, the pixels of the texture tile 430 may be classified into a foreground group 631, an intermediary group 633 and a background group 635. In some embodiments of the second algorithm, except for the pixel (0,0) of each group (also referred to as the upper-left pixel of each group), the R-, G-, B- and A-values of each pixel of this group are subtracted from the R-, G-, B- and A-values of the pixel (0,0) of this group, respectively.

Subsequently, the length of the compression result (also referred to as the lossless-compression result) is calculated (step S133), it is determined whether the calculated length is longer than the target length (step S151). When the calculated length is not longer than the target length, indicating that the lossless compression of the raw data is successful (the "No" path of step S151), the compression result, the text flag, the bitmap and the lossy-level flag are output (step S540). The text flag may be "1" to indicate that the second algorithm is used to reduce dependencies between pixels of the compression result. The lossy-level flag may be "0b00" to indicate that the raw data of the texture tile has not undergone any data reduction. When the calculated length of the compression result is longer than the target length, indicating that the lossless compression on the raw data was not successful (the "Yes" path of step S151), the data-reduction control in layers is performed (step S520 and step S171 or S173) and the reduced data has undergone the lossless-compression algorithm (step S131).

In the data reduction in layers, when the text flag is not "0" (the "No" path of step S520), it is determined whether the total number of data reductions does not exceed a predefined value (step S153). When the total number of data reductions does not reach the predefined value (the "No" path of step S153), the raw data of the texture tile is reduced (step S171). After the raw data of the texture tile is reduced (step S171), the reduced data has undergone the lossless-compression algorithm (step S510). In step S510, since the text flag is "1", the lossless-compression algorithm may use the second algorithm to reduce the dependencies between pixels, and then perform the lossless encoding on the reduced data. When the calculated length is not longer than the target length, indicating that the lossless compression of the reduced data is successful (the "No" path of step S151), the compression result, the text flag, the bitmap and the lossy-level flag are output (step S540). The text flag may be "1" to indicate that the second algorithm is used to reduce dependencies between pixels of the compression result. In some embodiments, the lossy-level flag may use two bits "0b01" or "0b10" to indicate that the raw data of the texture tile has undergone the data reduction of a specified layer. In some embodiments, the lossy-level flag may use three bits "0b001", "0b010" or "0b011" to indicate that the raw data of the texture tile has undergone the data reduction of a specified layer. The settings of the lossy-level flag may refer to the descriptions of FIG. 1. When the calculated length of the compression result is longer than the target length, indicating that the lossless compression on the reduced data was not successful (the "Yes" path of step S151), it is determined whether the total number of data reductions does not exceed a predefined value (step S153). When the total number of data reductions does not reach the predefined value (the "No" path of step S153), the next layer of data reduction is performed on the raw data of the texture tile (step S171). Details of steps S153 and S171 may refer to relevant descriptions of FIG. 1.

When the total number of data reductions exceeds the predefined value (the "Yes" path of step S153), the raw data of the texture tile is forcibly reduced to the target length or shorter (step S173) and the compression result and the lossy-level flag are output (step S540). In some embodiments, the lossy-level flag may use two bits "0b11" to indicate that the raw data of the texture tile is forcibly reduced to the target length or shorter. In some other embodiments, the lossy-level flag may use three bits "0b1000" or "0b111" to indicate that the raw data of the texture tile is forcibly reduced to the target length or shorter.

It should be understood that those skilled in the art may devise the flowchart of FIG. 5 to exclude the data reduction steps (such as steps S153, S171 and S173), and the invention should not be limited thereto. It other words, the "No" path of step S250 connects to step S540 and step S540 outputs no lossy-level flag.

Figure 7:
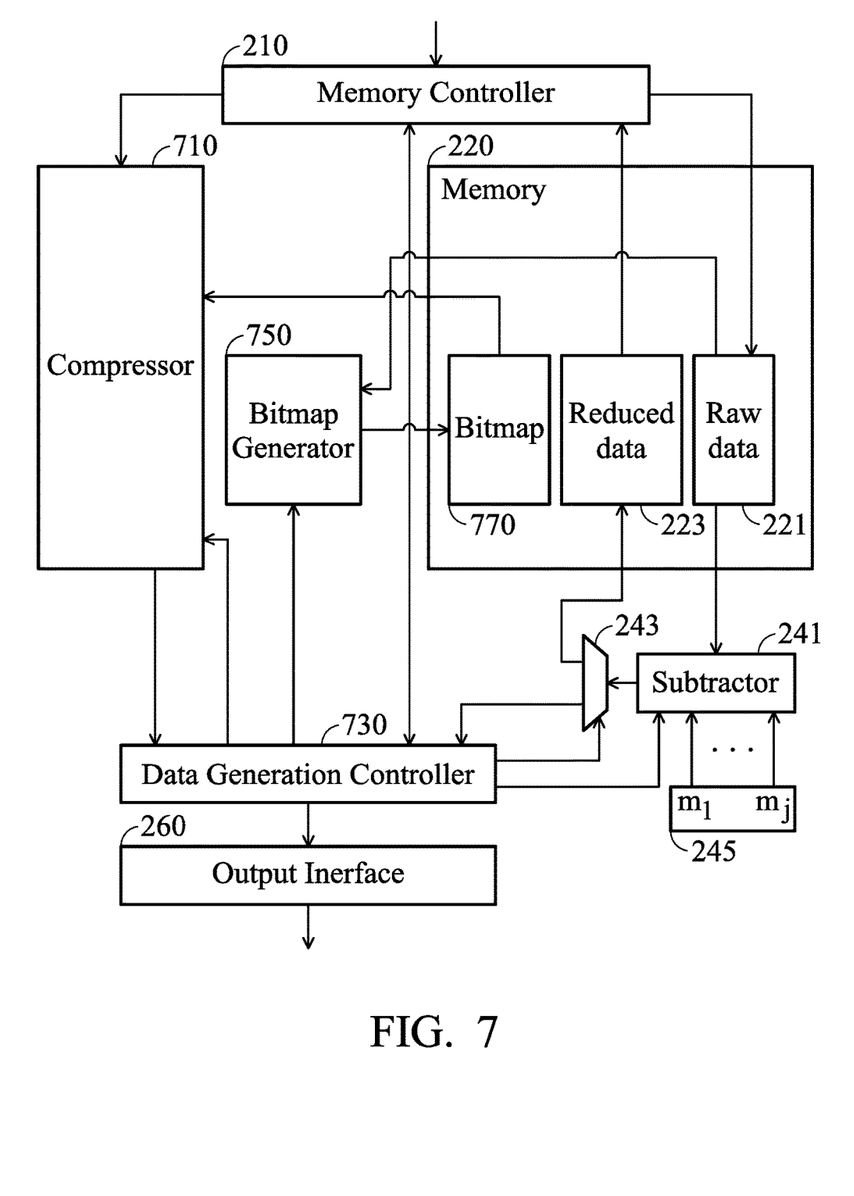
FIG. 7 is a block diagram of an apparatus for compressing texture tiles according to an embodiment of the invention.

FIG. 7 is a block diagram of an apparatus for compressing texture tiles according to an embodiment of the invention. A compressor 710 may use any of the two algorithms recited in step S510 to reduce dependencies between pixels, and then perform lossless encoding. Details of the lossless-compression algorithm performed in the compressor 710 may refer to the descriptions of step S510 and are omitted for brevity. After receiving raw data of a texture tile, a data generation controller 730 directs the memory controller 210 to store the raw data in the region 221 of the memory 220 and output the raw data to the compressor 710 and directs the compressor 710 to use the first algorithm to reduce dependencies between pixels, thereby enabling the compressor 710 to perform the lossless-compression algorithm comprising the first algorithm on the raw data. After the compressor 710 outputs a compression result (also referred to as a lossless-compression result) to the data generation controller 730, the data generation controller 730 calculates the length of the compression result and determines whether the length of the compression result is longer than the target length. When the length of the compression result is not longer than the target length, the data generation controller 730 outputs the compression result, the text flag and the lossy-level flag to an electronic component via an output interface 260, where the text flag indicates that the first algorithm is used to reduce dependencies between pixels and the lossy-level flag indicates that the raw data of the texture tile has not undergone any data reduction.

When the length of compression result is longer than the target result, the data generation controller 730 directs a bitmap generator 750 to generate a bitmap 770 as shown in Table 1 or 2 according to the raw data 221 and store the bitmap 770 in the memory 220. Details of how the bitmap generator 750 generates the bitmap 770 may refer to the descriptions of step S530 and are omitted for brevity. After the bitmap 770 is generated, the data generation controller 730 directs the compressor 710 to use the second algorithm to reduce dependencies between pixels with references made to the bitmap 770, thereby enabling the compressor 710 to perform the lossless-compression algorithm comprising the second algorithm on the raw data. Details of the lossless-compression algorithm performed in the compressor 710 may refer to the descriptions of step S510 and are omitted for brevity. Subsequently, the compressor 710 outputs the compression result to the data generation controller 730. The data generation controller 730 calculates the length of the compression result and determines whether the length of the compression result is longer than the target length. When the length of the compression result is not longer than the target length, the data generation controller 730 outputs the compression result, the text flag, the bitmap, and the lossy-level flag to an electronic component via the output interface 260, where the text flag indicates that the second algorithm is used to reduce dependencies between pixels and the lossy-level flag indicates that the raw data of the texture tile has not undergone any data reduction.

In some embodiments, when the compressor 710 uses the second algorithm to reduce dependencies between pixels but cannot make the compression result shorter than the target length, the data generation controller 730 coordinates with the divisor 241, the de-multiplexer 243 and the memory controller 210 to perform data reductions in layers, thereby enabling the compressor 710 to perform the lossless-compression algorithm on the reduced data. One may refer to the descriptions of FIG. 2 for the details of the divisor 241, the de-multiplexer 243, the register 245, and the memory controller 210, and those details are omitted here for brevity.

Figure 8:
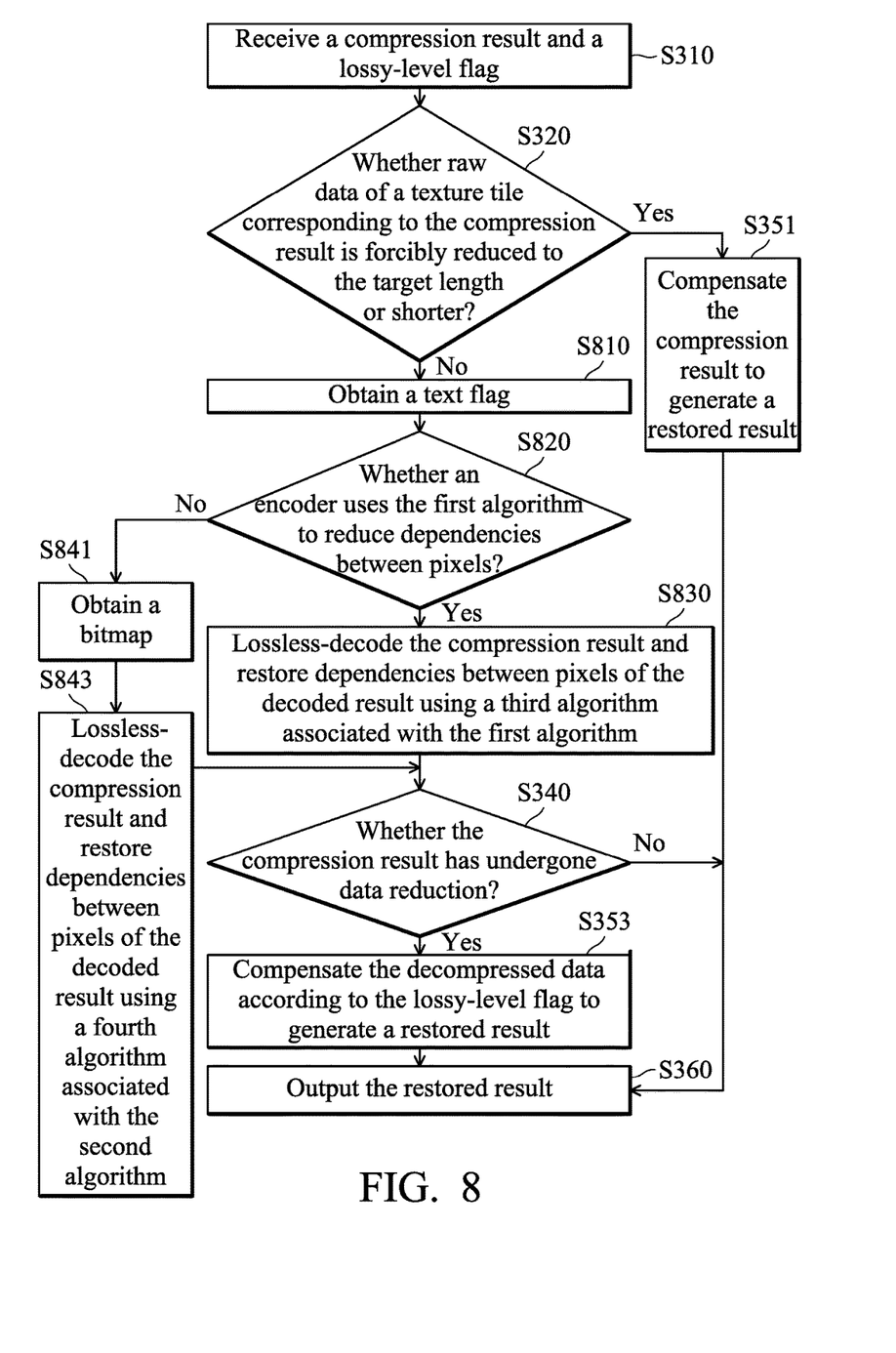
FIG. 8 is a flowchart illustrating a method for decompressing texture tiles according to an embodiment of the invention.

In order to restore the texture tile that has undergone different algorithms to reduce dependencies between pixels and the data-reduction control in layers, FIG. 8 is a flowchart illustrating a method for decompressing texture tiles according to an embodiment of the invention. The method may be performed in a texture decoder. After a compression result and a lossy-level flag are received (step S310), it is determined whether raw data of a texture tile corresponding to the compression result is forcibly reduced to the target length or shorter (step S320). If so (the "Yes" path of step S320), the compression result is compensated to generate a restored result (step S351) and the restored result is output to a texture operation of a 3D pipeline (step S360). Details of steps S310, S320, S351 and S360 may refer to the descriptions of FIG. 3 and are omitted for brevity.

Subsequently, a text flag is obtained (step S810), it is determined whether an encoder uses the first algorithm to reduce dependencies between pixels (step S820). If so (the "Yes" path of step S820), the compression result is lossless-decoded and dependencies between pixels of the decoded result are restored using a third algorithm associated with the first algorithm (step S830). Otherwise (the "No" path of step S820), a bitmap is obtained (step S841), the compression result is lossless decoded and dependencies between pixels of the decoded result are restored using a fourth algorithm associated with the second algorithm (step S843). The lossless decoding may be adaptive dictionary decoding, unary decoding, entropy decoding, or another type of decoding.

In some embodiments of step S830, except for the pixel (0,0) of the texture tile, the R-, G- and B-values of the pixel (0,0) are added to the R-, G- and B-values of each pixel, respectively. Those skilled in the art may use a similar but different first algorithm according to different design requirements and the invention should not be limited thereto.

In step S841, the obtained bitmap may be shown in FIG. 1 or 2. In step S843 specifically, pixels of the texture tile may be classified into two or three groups according to the bitmap. Subsequently, in some embodiments, except for the upper-left pixel of each group, the R-, G- and B-values of the upper-left pixel of this group are added to the R-, G- and B-values of each pixel of this group, respectively.

After the lossless decoding and the restoring of the dependencies between pixels (step S830 or S843), it is determined whether the received compression result has undergone data reduction according to the lossy-level flag (step S340). When the received compression result has not undergone data reduction (the "No" path of step S340), the decoded result is output to the texture operation of the 3D pipeline (step S360). When the received compression result has undergone data reduction (the "Yes" path of step S340), the decompressed data is compensated according to the lossy-level flag to generate a restored result (step S353) and the restored result is output to the texture operation of the 3D pipeline (step S360). Details of steps S340, S353 and S360 may refer to the descriptions of FIG. 3, and are omitted for brevity.

Although the embodiment has been described as having specific elements in FIGS. 2 and 7, it should be noted that additional elements may be included to achieve better performance without departing from the spirit of the invention. While the process flows described in FIGS. 1, 3, 5 and 8 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for compressing texture tiles, comprising:
classifying each pixel of a texture tile into one of a plurality of groups and generating a bitmap of the texture tile, wherein the bitmap comprises information indicating to which group each pixel of the texture tile belongs;
reducing dependencies between pixels of each group;
lossless-encoding each pixel of the texture tile to generate a first compression result;
outputting the first compression result and the bitmap;
lossless-compressing each pixel of the texture tile to generate a second compression result;
determining whether a length of the second compression result is longer than a target length; and
when the length of the second compression result is longer than the target length, generating the bitmap of the texture tile.

2. The method of claim 1, wherein the groups comprise a foreground and a background.

3. The method of claim 2, wherein the step of classifying each pixel of a texture tile into one of a plurality of groups and generating a bitmap of the texture tile comprises:
generating an R-channel histogram, a G-channel histogram and a B-channel histogram of the texture tile and calculating an R-channel boundary value, a G-channel boundary value and a B-channel boundary value accordingly;
determining whether an R-value, a G-value and a B-value of each pixel are greater than the R-channel boundary value, the G-channel boundary value and the B-channel boundary value, respectively; and
when two or more of the R-value, the G-value and the B-value of each pixel are greater than the respective boundary values, labeling this pixel as a foreground pixel; otherwise, labeling this pixel as a background pixel.

4. The method of claim 1, wherein the groups comprise a foreground, an intermediary and a background.

5. The method of claim 4, wherein the step of classifying each pixel of a texture tile into one of a plurality of groups and generating a bitmap of the texture tile comprises:
generating an R-channel histogram, a G-channel histogram and a B-channel histogram of the texture tile and calculating an R-channel middle range, a G-channel middle range and a B-channel middle range accordingly;
determining whether an R-value, a G-value and a B-value of each pixel are greater than an upper value of the R-channel middle range, an upper value of the G-channel middle range and an upper value of the B-channel middle range, respectively;
determining whether the R-value, the G-value and the B-value of each pixel are less than a lower value of the R-channel middle range, a lower value of the G-channel middle range and a lower value of the B-channel middle range, respectively; and
when two or more of the R-value, the G-value and the B-value of each pixel are greater than the respective upper values, labeling this pixel as a foreground pixel; when two or more of the R-value, the G-value and the B-value of each pixel are less than the respective lower values, labeling this pixel as a background pixel; otherwise, labeling this pixel as an intermediary pixel.

6. The method of claim 1, wherein the step of reducing dependencies between pixels of each group comprises:
except for an upper-left pixel of each group, an R-value, a G-value and a B-value of each pixel of this group are subtracted from an R-value, a G-value and a B-value of the upper-left pixel of this group, respectively.

7. An apparatus for compressing texture tiles, comprising:
a bitmap generator;
a compressor; and
a data generation controller, coupled to the bitmap generator and the compressor, directing the bitmap generator to classify each pixel of a texture tile into one of a plurality of groups and generate a bitmap of the texture tile, wherein the bitmap comprises information indicating to which group each pixel of the texture tile belongs; and directing the compressor to reduce dependencies between pixels of each group, lossless-encode each pixel of the texture tile to generate a first compression result, and output the first compression result and the bitmap;
wherein the data generation controller directs the compressor to lossless-compress each pixel of the texture tile to generate a second compression result determines whether the length of the second compression result is longer than a target length; and when the length of the second compression result is longer than the target length, directs the bitmap generator to generate the bitmap of the texture tile.

8. The apparatus of claim 7, wherein the groups comprise a foreground and a background.

9. The apparatus of claim 8, wherein the bitmap generator generates an R-channel histogram, a G-channel histogram and a B-channel histogram of the texture tile and calculates an R-channel boundary value, a G-channel boundary value and a B-channel boundary value accordingly; determines whether an R-value, a G-value and a B-value of each pixel are greater than the R-channel boundary value, the G-channel boundary value and the B-channel boundary value, respectively; when two or more of the R-value, the G-value and the B-value of each pixel are greater than the respective boundary values, labels this pixel as a foreground pixel; otherwise, labels this pixel as a background pixel.

10. The apparatus of claim 7, wherein the groups comprise a foreground, an intermediary and a background.

11. The apparatus of claim 10, wherein the bitmap generator generates an R-channel histogram, a G-channel histogram and a B-channel histogram of the texture tile and calculates an R-channel middle range, a G-channel middle range and a B-channel middle range accordingly; determines whether an R-value, a G-value and a B-value of each pixel are greater than an upper value of the R-channel middle range, an upper value of the G-channel middle range and an upper value of the B-channel middle range, respectively; determines whether the R-value, the G-value and the B-value of each pixel are less than a lower value of the R-channel middle range, a lower value of the G-channel middle range and a lower value of the B-channel middle range, respectively; and when two or more of the R-value, the G-value and the B-value of each pixel are greater than the respective upper values, labels this pixel as a foreground pixel; when two or more of the R-value, the G-value and the B-value of each pixel are less than the respective lower values, labels this pixel as a background pixel; otherwise, labels this pixel as an intermediary pixel.

12. The apparatus of claim 7, wherein the compressor, except for an upper-left pixel of each group, subtracts an R-value, a G-value and a B-value of each pixel of this group from an R-value, a G-value and a B-value of the upper-left pixel of this group, respectively.

13. A method for decompressing texture tiles, comprising:
receiving a compression result and a text flag;
determining which one of a first algorithm and a second algorithm is used to reduce dependencies between pixels of a texture tile by an encoder;
when the first algorithm is used to reduce dependencies between pixels of the texture tile by the encoder, lossless-decoding the compression result and using a third algorithm associated with the first algorithm to restore dependencies between pixels of the texture tile;
when the second algorithm is used to reduce dependencies between pixels of the texture tile by the encoder, obtaining a bitmap, lossless-decoding the compression result and using a fourth algorithm associated with the second algorithm to restore dependencies between pixels of the texture tile according to the bitmap to generate a first restored result;
receiving a lossy-level flag;
determining whether the compression result has undergone data reduction according to the lossy-level flag;
when the compression result has undergone the data reduction, compensating the first restored result to an original length to generate a second restored result; and
outputting the second restored result to a texture operation of a 3D (three-dimensional) pipeline.

14. The apparatus of claim 13, wherein the step of using a fourth algorithm associated with the second algorithm to restore dependencies between pixels of the texture tile according to the bitmap comprises:
classifying the pixels of the texture tile into a plurality of groups according to the bitmap; and
for each group, except for the upper-left pixel, adding an R-value, a G-value and a B-value of the upper-left pixel to an R-value, a G-value and a B-value of each pixel, respectively.

15. The apparatus of claim 13, comprising:
when the compression result has not undergone the data reduction, outputting the first restored result to the texture operation of the 3D pipeline.

* * * * *